June 29, 1965 WOO F. CHOW 3,192,410
LOGIC CIRCUIT WITH NRZ OPERATION
Filed Feb. 11, 1963
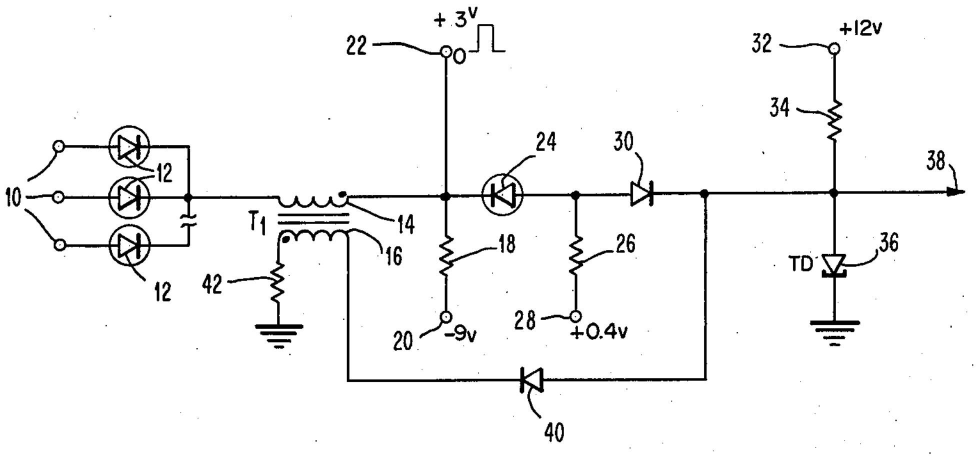
INVENTOR
WOO F. CHOW
BY G. Donald Weber, Jr.
AGENT United States Patent Office 3,192,410

Patented June 29, 1965

3,192,410

LOGIC CIRCUIT WITH NRZ OPERATION

Woo F. Chow, Horsham Township, Pa., assignor to Sperry Rand Corporation, New York, N.Y., a corporation of Delaware Filed Feb. 11, 1963, Ser. No. 257,631
11 Claims. (Cl. 307—88.5)

This invention relates to a logic circuit using tunnel diodes as the active elements thereof. In particular, the invention relates to a logic circuit wherein the non-return to zero (NRZ) mode of operation is provided such that reset circuitry may be eliminated.

The development of the tunnel diode as a component which is utilizable in the circuitry of high-speed electronic-data-processing systems has been a recent advance in the state of the art. A great many circuits utilizing tunnel diodes have been contrived and suggested. However, these circuits rely upon the return-to-zero (NRZ) mode of operation. That is, in order for an output signal from the circuit to be detected properly, the active tunnel diodes in the circuit must be returned to one or the other of its bistable operating conditions prior to the application of an information signal. The information signal then performs a predetermined operation on the tunnel diode whereby the information may be detected at the output of the tunnel diode circuit. Thereafter, the entire process of return-to-zero and then the application of input information is repeated. The disadvantages of this type of circuit and circuit operation are manifold. Therefore, the present circuit was derived.

The subject circuit provides a tunnel diode to which information may be supplied to perform a predetermined operation. This information signal may be applied via a current switching circuit. A typical current switching circuit utilizes the stored-charge techniques which are described in the copending application of Brian E. Sear, entitled Logic Circuit, which was filed on February 21, 1962, has the Serial Number 174,829 and is assigned to the assignee of this application. Included in the switching circuit is a transformer which is coupled to the tunnel diode such that a sampling of the tunnel diode condition may be obtained. Under certain conditions, the transformer will be energized such that current will be drawn from the tunnel diode whereby the tunnel diode is reset.

Thus, it will be seen that one object of this invention is to provide a logic circuit which requires only one clock source.

Another object of this invention is to provide a logic circuit having only one clock source for which there are no critical waveform requirements.

Another object of this invention is to provide a logic circuit having only one clock source whereby timing problems between set and reset clock sources are eliminated.

Another object of this invention is to provide a logic circuit having operational flexibility whereby overall system performance is improved.

These and other objects and advantages of this invention will become more readily apparent with the reading of the detailed description of the circuit in conjunction with the attached drawing which is a schematic diagram of one embodiment of the invention.

Referring to the drawing, it is noted that a NOR circuit is presented. It is to be understood, of course, that the principles of the circuit operation are applicable to other circuits which perform other logic functions. However, the NOR circuit is used as a typical and convenient illustrative circuit.

In the circuit there are shown three input sources 10 although the circuit is not limited to three inputs. Each of the input sources may be any conventional type of source capable of supplying signals having two distinct levels. For example, the input source 10 may represent a circuit similar to that shown, wherein the input signal is supplied by a bistable tunnel diode. Each source 10 is connected to the anode of an input coupling diode 12. The input coupling diodes are germanium diodes or silicon diodes as for example, GE CSD1 type diodes which exhibit charge storing characteristics as do all diodes enclosed in a circle. The cathodes of the input coupling diodes are connected to one terminal of the primary winding 14 of transformer T1. Transformer T1 is a pulse transformer of a relatively low transformation ratio. For example 1:1 or 1:1.5, or the like. If additional power amplification is desired, different ratios may be employed. Another terminal of primary winding 14 is connected to one terminal of resistor 18. Resistor 18 which may be on the order of 5,000 ohms has another terminal thereof connected to a potential source 20. Source 20 may be any conventional source, for example a battery, which is capable of supplying a substantially constant potential of approximately −9 volts with respect to ground. Resistor 18 and source 20 combine to provide a substantially constant current sink. Also connected to the second mentioned terminal of transformer winding 14 is the source 22. Source 22 may be any conventional type of source which is capable of supplying a pulse type signal and which blocks current flow towards source 22. In the preferred embodiment, the base potential of the signal supplied by source 22 will be on the order of ground potential and the peak magnitude of the pulse will be on the order of +3 volts with respect to ground. The pulses supplied by source 22 may be selectively applied or, in the alternative, may be synchronously applied as a clock pulse for example. It should be noted of course, that the signal applied by source 22 may be a narrow, spike-like, pulse or may be a half-sine-wave pulse. The primary limitation of the pulse supplied by source 22 is that enough current be supplied thereby to satisfy the requirements of the remainder of the circuit. Connected to the second mentioned terminal of primary winding 14 is the cathode of coupling diode 24. Diode 24 is preferably a diode similar to input diodes 12 and having similar characteristics including the charge storing capability. The anode of diode 24 is connected to one terminal of resistor 26. The other terminal of resistor 26 which may be on the order of 100 ohms is connected to source 28. Source 28 may be any conventional type of source capable of supplying a substantially constant potential on the order of +0.4 volt with respect to ground. Source 28 and resistor 26 combine to provide a substantially constant voltage source. Also connected to the anode of diode 24 is the anode of diode 30. Diode 30 may preferably be a silicon diode, for example a Fairchild FD7 type diode. Basically, however, the diode 30 is a high-speed switching diode having little or no charge storage effect. The cathode of diode 30 is connected to the anode of tunnel diode 36. The cathode of tunnel diode 36 is connected to a reference potential source, as for example ground. Tunnel diode 36 may be any type of tunnel diode but a preferred type is an RCA 1N3859 type tunnel diode. This type of tunnel diode has a peak-current on the order of 20 milliamperes.

Also connected to the anode of tunnel diode 36 is one terminal of resistor 34. Another terminal of resistor 34 which may be on the order of about 820 ohms is connected to source 32. Source 32 may be any conventional source, as for example a battery or the like, capable of supplying a substantially constant potential on the order of approximately +12 volts with respect to ground. Source 32 and resistor 34 combine to provide a substantially constant current source. The output terminal 38 is also connected to the anode of tunnel diode 36 and may represent any type of output device. Output terminal 38 may, in fact, represent a terminal similar to a terminal or source 10 previously described. The output signal obtained at terminal 38 is detected with respect to ground potential.

In addition, the anode of diode 40 is connected to the anode of tunnel diode 36. Diode 40 may preferably be a silicon diode similar to diode 30 described supra but is not so limited. Diode 40 is a high speed switching diode exhibiting little or no charge storing capabilities. The cathode of diode 40 is connected to one terminal of secondary winding 16 of transformer T1. Another terminal of winding 16 is connected to one terminal of current limiting resistor 42. Limiting resistor 42, which may be on the order of about 100 ohms (and may even be omitted) has another terminal thereof connected to a reference potential source, as for example ground.

In describing the operation of the circuit, it will be assumed, for convenience only, that the tunnel diode 36 is in the low voltage operating condition. The opposite initial assumption could be just as easily made. Thus, the potential value at the anode of the tunnel diode 36 is on the order of +50 millivolts. Moreover, it is initially assumed that each of the sources 10 applies a low level signal (on the order of +50 millivolts according to the convention adapted in this description). The input coupling diodes 12 are effectively zero biased inasmuch as the cathodes thereof are clamped substantially at ground potential by the source 22 and the anodes are at +50 millivolts. With the small potential difference thereacross, there is no forward current in diodes 12 whereby charge is not stored therein. Moreover, the absence of forward current in diodes 12 denotes a lack of current and/or magnetic action at transformer T1.

However, the current source comprising source 28 and resistor 26 produces current which passes through diode 24 thereby storing charge in the diode. The values suggested supra for the components are, of course, not limitative of the invention but rather are suggested examples which will produce a forward current of approximately 2 milliamperes through diode 24. The forward current produced in diode 24 causes charge to be stored therein. With the application of the clock signal by source 22, the potential at the cathode of diode 24 abruptly rises to a potential of about +3 volts whereby input diodes 12 are clearly reverse-biased. Inasmuch as forward current caused charge to be stored in diode 24, reverse current will pass therethrough until all of the stored charge has been swept out of the diode. While the diode 24 has reverse current therein, it appears virtually as a short circuit. Thus, the potential at the anode of the silicon diode 30 rises to nearly 3 volts. This large potential is sufficiently beyond the knee or breakpoint of the silicon diode characteristic curve (typically about 0.7 volt) such that the diode 30 conducts a large current. This large current and increased potential are applied to the anode of tunnel diode 36 whereby tunnel diode 36 is switched to the high voltage operating condition.

The change in the operating condition of the tunnel diode may be detected at output terminal 38. It should be noted in the operation of the circuit, that the impedance of diode 24 is negligible compared to the 5,000 ohm impedance of resistor 18. Therefore, a much greater portion of the current supplied by source 22 will pass through diode 24. Similarly, the impedance of the silicon diode 30, when strongly forward biased, is smaller than the 100 ohm impedance of resistor 26. Therefore, a greater portion of the current passes through the diode 30. Again, the voltage of the tunnel diode 36 is on the order of only +400 to +450 millivolts maximum and is much smaller than the knee voltage of diode 40 whereby there is relatively no current in this latter path. Therefore, a greater portion of the current passes to tunnel diode 36. Thus, it will be seen that even though the several current limiting resistors in the various networks will somewhat load the circuit, the load is inconsequential to this operation of the circuit. Therefore, the tunnel diode 36 will be switched to the high voltage state by the application of a clock signal in the absence of an input signal.

If it is assumed now that an input signal supplied by at least one of the sources 10 switches to the high level (+450 millivolts according to the convention adapted), forward current will flow through input diode 12. The forward current through input diode 12 causes the storage of charge therein. The forward current will also pass through primary winding 14 of transformer T1. However, since the windings of transformer T1 are oppositely poled, even though the forward current in winding 14 tends to induce current in the secondary winding 15, the sense of the current in the winding 16 would be opposite to the polarity of diode 40 whereby the secondary winding circuit appears as an open circuit.

Inasmuch as at least one of diodes 12 is forward biased, the potential at the cathode of diode 24 will rise to about +200 millivolts. That is, source 10 provides a potential of about +450 millivolts and about 200–250 millivolts are dropped across diode 12. The relatively high potential at the cathode of diode 24 is effective to substantially zero-bias diode 24 in view of the relatively small potential applied at the anode thereof. Thus, forward current is not produced in diode 24 whereby charge is not stored therein.

The application of the clock pulse by source 22 again operates to raise the potential at the cathode of diode 24 to about +3 volts. However, diode 24 has been effectively zero-biased whereby charge has not been stored therein. Thus diode 24 appears to be a substantially open circuit to the clock pulse.

However, charge has been stored in the input diode 12 whereby this diode appears as a short-circuit relative to the reverse current applied. Thus, current will tend to pass from the source 22 to source 10 via primary winding 14 and input diode 12. The current which passes through primary winding 14 induces a current in secondary winding 16 of transformer T1. The current induced in winding 16 is of such polarity that diode 40 is forward biased. Moreover, the current which is drawn through diode 40 is drawn from tunnel diode 36 whereby tunnel diode 36 is switched to the low level operating condition. This output condition is detected at output terminal 38.

It will be obvious from the above description of the operation of the circuit, that an output signal is produced only in the absence of input signals and the application of input signals is indicated by the absence of output signals. This type of operation is typical of NOR logic operation. Furthermore, it is obvious that the application of an input signal by one of the sources 10 to an input diode 12 will store charge in the input diodes and effectively reverse-bias the diode 24 whereby charge may not be stored therein. Thus, a clock signal will, of necessity, pass through winding 14 of transformer T1 thereby inducing a current in secondary winding 16 of the transformer. Thus, current will be drawn, via diode 40, away from tunnel diode 36 such that the tunnel diode will be reset to the low voltage operating condition. This operation will occur whether the tunnel diode 36 was previously in the high level operating condition or in the low level operating condition.

The alternative operation is also similar in principle. That is, in the absence of any input signals, all of the input coupling diodes 12 are reverse biased whereby no charge is stored therein. However, coupling diode 24 is forward biased (by a current source comprising potential source 28 and resistor 26) whereby charge is stored therein. The application of the clock signal will find the current path including the transformer to be of high impedance inasmuch as the input coupling diodes are effectively reverse-biased. On the contrary, however, coupling diode 24 is a relatively low impedance for reverse current due to the charge storage phenomena.

Therefore, current will pass into tunnel diode 36 via diode 30 whereby tunnel diode 36 will be switched to the high voltage operating condition regardless of whether it was previously in the low voltage or high voltage operating condition.

Thus, it will be seen that the tunnel diode 36 will have the operating condition thereof altered in accordance with the application of a clock pulse which is controlled only by the presence or absence of input signals. It is unnecessary to provide a special reset circuit which includes a reset clock signal. The advantages of this type of circuit are described supra. It is contemplated that certain modifications may be made in the circuit configuration especially in respect to the circuit component values and the parameter values of the circuit. However, so long as the modifications fall within the scope of the invention according to the principles set forth, these modifications are meant to be included within this description.

The embodiments of the invention in which an exclusive property or privilege is claimed are defined as follows:

1. A logic circuit in which NRZ operation is effected comprising, input means, transformer means, input coupling diodes exhibiting charge storing capabilities connected between said input means and one terminal of a first winding of said transformer means, a first substantially constant current source connected to a further terminal of said first winding, means for supplying periodic pulses connected to said further terminal of said first winding, a second substantially constant current source, a coupling diode exhibiting charge storing capabilities connected between said further terminal and said second current source, a tunnel diode, a first high-speed-switching isolating diode connected between said coupling diode and said tunnel diode, bias means connected to said tunnel diode to bias said tunnel diode in one of its two stable states, a reference potential source, a second high-speed-switching diode, a second winding of said transformer means connected between said reference source and said second high-speed-switching diode, said second high speed diode being further connected to said tunnel diode, and output means connected to said tunnel diode.

2. A NOR logic circuit using NRZ techniques and comprising a tunnel diode, means for biasing said tunnel diode in the bistable mode of operation, input means, transformer means comprising first and second windings, said input means connected to one terminal of said first winding and selectively exhibiting bilateral conduction, current switching means connected between another terminal of said first winding and said tunnel diode and selectively exhibiting bilateral conduction only in the absence of bilateral conduction by said input means, a reference potential source, said second winding connected between said reference potential source and said tunnel diode, and output means connected to said tunnel diode.

3. A NOR logic circuit using NRZ techniques and comprising a tunnel diode, means for biasing said tunnel diode in the bistable mode of operation, charge storage coupling diodes, input means connected to said coupling diodes, transformer means comprising first and second windings, said coupling diodes further connected to one terminal of said first winding, current switching means connected between another terminal of said first winding and said tunnel diode, a reference potential source, a rectifier diode connected to said tunnel diode, said second winding connected between said reference potential source and said rectifier diode, and output means connected to said tunnel diode.

4. A logic circuit in which NRZ operation is effected comprising, input means, said input means operative to provide input signals of high or low levels alternatively, transformer means, input coupling diodes exhibiting charge storing capabilities connected between said input means and one terminal of a first winding of said transformer means, a first substantially constant current source connected to a further terminal of said first winding, said first current source providing current of such magnitude and sense that forward current and charge-storage exists in said input coupling diodes only when a high level input signal is supplied thereto, a second substantially constant current source, a coupling diode exhibiting charge storing capabilities connected between said further terminal and said second current source, said second current source providing current of such magnitude and sense that forward current and charge-storage exists in said coupling diode only when a low level input signal is supplied to said input coupling diodes, means for supplying periodic pulses connected to said further terminal of said first winding, said means for supplying periodic pulses being operable to provide a reverse current in the diode which has had charge stored therein, a tunnel diode, a first high-speed-switching isolating diode connected between said coupling diode and said tunnel diode to provide a relatively high impedance to the constant current supplied by said second current source and to provide a relatively low impedance to the reverse current selectively supplied by said means for supplying periodic pulses via said coupling diode, bias means connected to said tunnel diode to bias said tunnel diode in one of its two stable states, a reference potential source, a second high-speed-switching diode, a second winding of said transformer means connected between said reference source and said second high-speed-switching diode, said diode being further connected to said tunnel diode whereby the current in said second winding of said transformer may be controlled, and output means connected to said tunnel diode.

5. A logic circuit in which NRZ operation is effected comprising, input means for supplying input signals, transformer means, input coupling means exhibiting charge-storing capabilities connected between said input means and one terminal of a first winding of said transformer means, a first substantially constant current source connected to a further terminal of said first winding and operable to provide charge-storing current in said input coupling means in accordance with the input signals supplied by said input means, means for supplying periodic pulses connected to said further terminal of said first winding whereby current may be provided in any charge-storing means which has charge stored therein, intermediate coupling means exhibiting charge storing capabilities, a second substantially constant current source, said intermediate coupling means connected between said further terminal and said second current source such that said second current source may provide charge-storing current in said intermediate coupling means in accordance with the input signals supplied by said input means, a tunnel diode, a first non-linear impedance means connected between said coupling diode and said tunnel diode, the impedance of said first non-linear impedance means being controlled by the current supplied thereto, bias means connected to said tunnel diode to bias said tunnel diode in one of its two stable states, a reference potential source, a second non-linear impedance means, a second winding of said transformer means connected between said reference source and said second non-linear impedance means, said non-linear impedance means being further connected to said tunnel diode such that the relative impedance is controlled by the state of said tunnel diode, and output means connected to said tunnel diode.

6. A NOR logic circuit using NRZ techniques and comprising, a tunnel diode, means for biasing said tunnel diode in the bistable mode of operation, input means, first winding means, said input means connected to a first terminal of said first winding means and selectively exhibiting bilateral conduction, current supplying means connected to a second terminal of said first winding means, current switching means connected between said current supplying means and said tunnel diode and selectively exhibiting bilateral conduction, said input means and said current switching means exhibiting current conduction mutually exclusively, a reference potential source, second winding means inductively linked with said first winding means, said second winding means connected between said reference potential source and said tunnel diode, and output means connected to said tunnel diode.

7. A logic circuit in which NRZ operation is effected comprising, input means, transformer means, first semiconductor means exhibiting charge storing capabilities connected between said input means and one terminal of a first winding of said transformer means, a first substantially constant current source connected to a further terminal of said first winding, means for supplying periodic pulses connected to said further terminal of said first winding, a second substantially constant current source, second semiconductor means exhibiting charge storing capabilities connected between said further terminal and said second current source, bistable semiconductor means, third semiconductor means connected between said second semiconductor means and said bistable semiconductor means, bias means connected to said bistable semiconductor means to bias said semiconductor in one of its two stable states, fourth semiconductor means connected to said bistable semiconductor means, a second winding of said transformer means connected to said fourth semiconductor means and adapted to be connected to a reference potential source, and output means connected to said bistable semiconductor means.

8. A logic circuit in which NRZ operation is effected comprising, transformer means, input coupling diodes for receiving input signals and exhibiting charge storing capabilities connected to one terminal of a first winding of said transformer means, a first substantially constant current source connected to a further terminal of said first winding, said first current source providing current of such magnitude and sense that forward current and charge-storage exists in said input coupling diodes only when a high level input signal is supplied thereto, a second substantially constant current source, a coupling diode exhibiting charge storing capabilities connected between said further terminal and said second current source, said second current source providing current of such magnitude and sense that forward current and charge-storage exists in said coupling diode only when a low level input signal is supplied to said input coupling diodes, means for supplying periodic pulses connected to said further terminal of said first winding, said means for supplying periodic pulses being operable to provide a reverse current in the diode which has had charge stored therein, a tunnel diode, a first high-speed-switching isolating diode connected between said coupling diode and said tunnel diode to provide a relatively high impedance to the constant current supplied by said second current source and to provide a relatively low impedance to the reverse current selectively supplied by said means for supplying periodic pulses via said coupling diode, bias means connected to said tunnel diode to bias said tunnel diode in one of its two stable states, a second high-speed-switching diode, a second winding of said transformer means connected to said second high-speed-switching diode, said diode being further connected to said tunnel diode whereby the current in said second winding of said transformer may be controlled, and output means connected to said tunnel diode.

9. A NOR logic circuit using NRZ techniques and comprising a tunnel diode, means for biasing said tunnel diode in the bistable mode of operation, charge storage coupling diodes, input means connected to said coupling diodes, transformer means comprising first and second windings, said coupling diodes further connected to one terminal of said first winding, current switching means connected between another terminal of said first winding and said tunnel diode, a rectifier diode connected to said tunnel diode, said second winding connected to said rectifier diode, and output means connected to said tunnel diode.

10. A logic circuit in which NRZ operation is effected comprising, transformer means, input coupling diodes for receiving input signals and exhibiting charge storing capabilities connected to one terminal of a first winding of said transformer means, a first substantially constant current source connected to a further terminal of said first winding, means for supplying periodic pulses connected to said further terminal of said first winding, a second substantially constant current source, a coupling diode exhibiting charge storing capabilities connected between said further terminal and said second current source, a tunnel diode having first and second conductive stable states, a first high-speed-switching isolating diode connected between said coupling diode and said tunnel diode, bias means connected to said tunnel diode to bias said tunnel diode in said first stable state, a second high-speed-switching diode, a second winding of said transformer means connected to said second high-speed-switching diode, said second high speed diode being further connected to said tunnel diode, and output means connected to said tunnel diode.

11. The logic circuit as recited in claim 8 wherein said second high-speed-switching diode and said second winding pass current therethrough only when said tunnel diode is in said second stable state.

References Cited by the Examiner

UNITED STATES PATENTS 3,040,186 6/62 Van Duzer ____________ 307—88.5

ARTHUR GAUSS, *Primary Examiner.*